United States Patent [19]
Dinnerstein

[11] 3,785,347
[45] Jan. 15, 1974

[54] ANIMAL EXERCISING OBSERVATORY

[75] Inventor: Albert J. Dinnerstein, Brooklyn, N.Y.

[73] Assignee: Metaframe Corporation, Maywood, N.J.

[22] Filed: Mar. 23, 1972

[21] Appl. No.: 237,355

[52] U.S. Cl............................... 119/29, 272/57 I
[51] Int. Cl............................................ A01k 29/00
[58] Field of Search .................... 119/29; 272/57 I; 220/5 S, 38.5, 31 S

[56] References Cited
UNITED STATES PATENTS

| 2,681,638 | 6/1954 | Carvell | 119/29 |
| 2,889,089 | 6/1959 | Herrick et al. | 220/38.5 X |
| 3,145,872 | 8/1964 | Hayes | 220/38.5 X |
| 3,066,951 | 12/1962 | Gray | 272/57 I X |

Primary Examiner—Louis G. Mancene
Assistant Examiner—J. N. Eskovitz
Attorney—Abraham Friedman et al.

[57] ABSTRACT

An animal exercising observatory which includes a hollow transparent sphere in which an animal may exercise for causing translatory rolling of the sphere along an external surface in contact therewith, the animal remaining continuously observable. The sphere includes a door which in contour is complemental to the sphere for permitting access into the latter.

16 Claims, 14 Drawing Figures

3,785,347

PATENTED JAN 15 1974

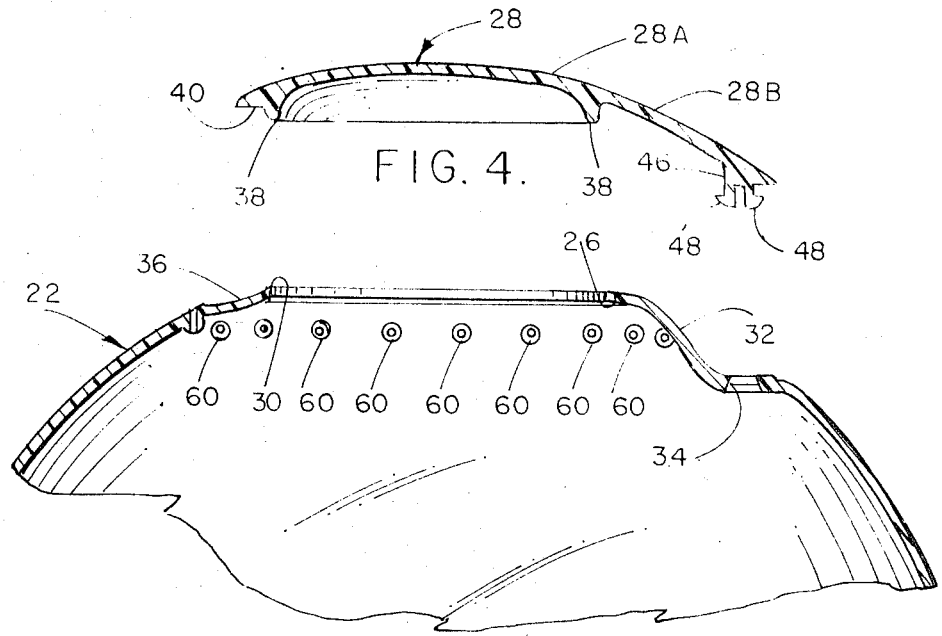
FIG. 4.
FIG. 5.
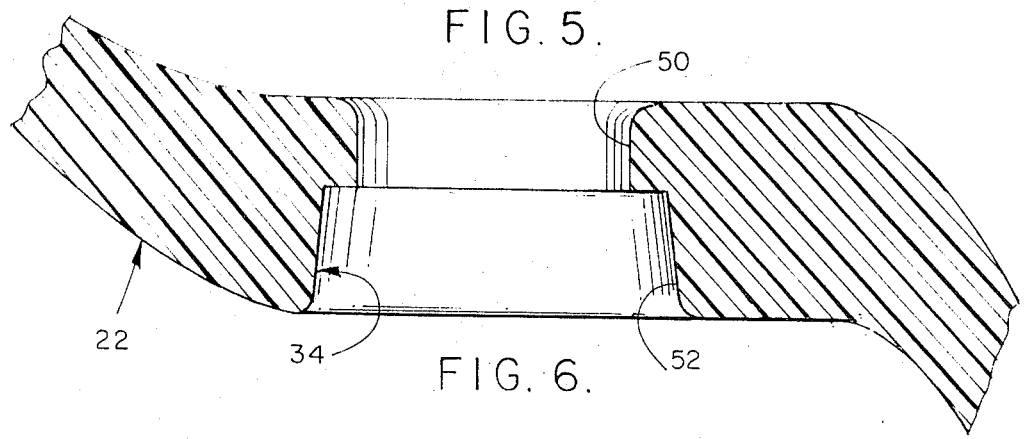
FIG. 6.
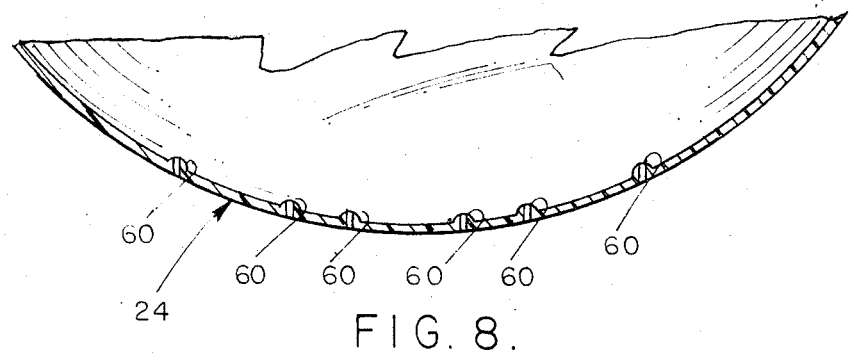
FIG. 8.

ANIMAL EXERCISING OBSERVATORY

BACKGROUND OF THE INVENTION

The present invention relates generally to accessory devices for home pets or rodent variety, and more particularly to an animal exercising observatory in the form of a hollow sphere in which an animal may move freely for causing translatory rolling of the sphere along a floor or other horizontal surface upon which the sphere freely rests.

As is commonly understood, the problem often confronting the hobbyist, who maintains pets or rodent variety, relates generally to the manner by which the hobbyist is to permit the rodent to exercise, generally freely, within a closed environment, so as to prevent the rodent from escaping, yet permit the rodent to remain active and remain an enjoyable pet.

Rodents are often maintained or restricted within cages or the like which, obviously, limits, to a great extent, the space available for the rodent to exercise or to remain active within. The hobbyist often resorts to various devices such as mazes, exercise wheels, or other devices of similar nature which generally confine the animal again to a restricted location.

SUMMARY OF THE INVENTION

Accordingly, it is an object of the present invention to provide a spherical animal exercising observatory, which is hollow, and into which an animal of rodent variety may be disposed and confined, yet because of the translatory rolling capacity of the sphere, there is maximized the number of locations toward or away from which the rodent may selectively move and remain continuously observable by the hobbyist.

It is another object of the present invention to provide a spherical animal exercising observatory which is apertured for permitting ingress of air thereinto, yet is urine retentative, and provided with a roughened texture which may be grasped by a rodent therein and will remain generally gnaw-resistant.

Thus, the present invention may be generally characterized as relating to an animal exercising observatory comprising a hollow sphere, said sphere being provided with an animal access passageway, and closure means operatively associated with a portion of said sphere adjacent said access passageway for permitting selective opening and closing of the latter, said closure means including an exposed partially spherical external convexity which in contour is complemental to said sphere and which when closing said access passageway permits generally unrestricted universal translatory rolling of said sphere along an external surface in contact therewith; said animal exercising observatory including an internal surface, said internal surface including a plurality of inwardly extending animal-grasping apertured projections communicating the interior of said sphere with the exterior of the latter, said apertured projections acting to retain liquid animal-excrement internally of said sphere while permitting the ingress of air into the latter.

BRIEF DESCRIPTION OF THE INVENTION

With the above and additional objects and advantages in view, as will hereinafter appear, this invention comprises the devices, combinations and arrangements of parts hereinafter described and illustrated in the accompanying drawings of a preferred embodiment in which:

FIG. 4 illustrates a vertical cross-sectional view of the closure element illustrated in FIG. 1;

FIG. 5 illustrates a vertical fragmentary cross-sectional view of the upper portion of the sphere as taken along the line 5—5 in FIG. 2;

FIG. 6 illustrates an enlarged fragmentary vertical cross-sectional view of a portion of the upper spherical portion to which is connected the extreme rightmost end portion of the closure element illustrated in FIG. 4;

FIG. 8 illustrates a cross-sectional view taken along the line 8—8 in FIG. 7;

Figure 13:
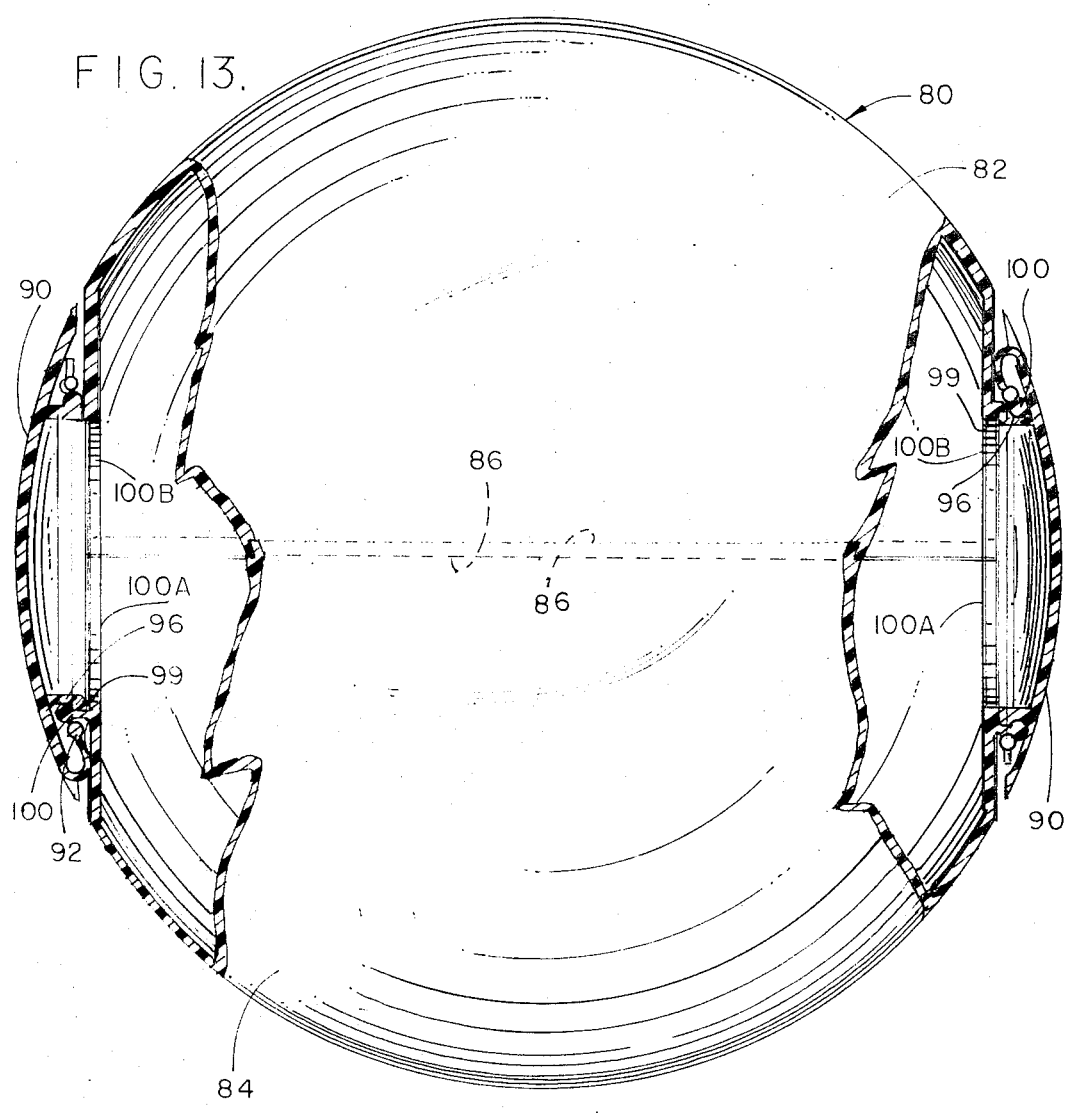
Figure 12:
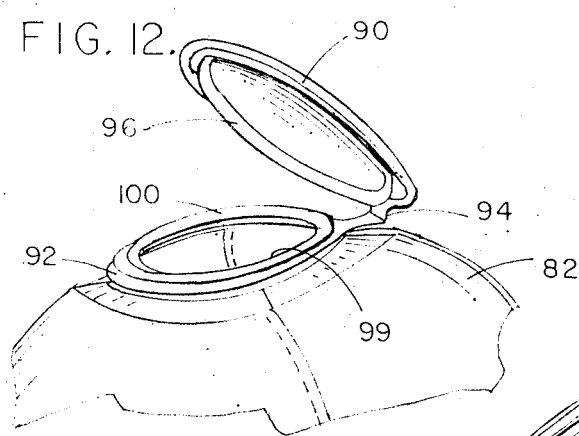
FIG. 12 is a fragmentary perspective view of an alternate embodiment of the animal exercising observatory pursuant to the present invention, and illustrating one end portion at which is provided an animal access passageway and a closure element generally hingedly associated with the passageway, the closure element being shown in an open condition.
Figure 14:
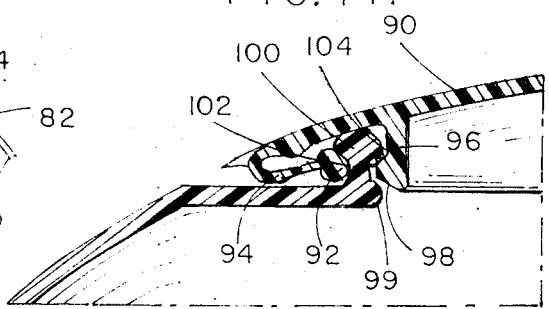

FIG. 13 is a frontal elevational view, partially fragmented, and partially in cross-section, illustrating the closure elements as diametrically opposed relative to one another at opposite portions of the sphere, each of the closure elements being shown in a closed condition pursuant to the alternate embodiment illustrated generally in FIG. 12; and FIG. 14 is a fragmentary cross-sectional view taken generally in the plane of FIG. 13 and illustrating the snap-fit association of the closure elements as associated with the animal access passageways of the spherical body, each closure element having a generally projecting wall portion from which annularly extends a ridge for interfitting into an inner groove provided in a projecting shoulder formed as part of the spherical body, each closure element also having an annular collar detachably associated with the projecting shoulder of the spherical body and seated in an external annular groove in the shoulder projecting from the spherical body.

DETAILED DESCRIPTION OF THE INVENTION

Figure 1:
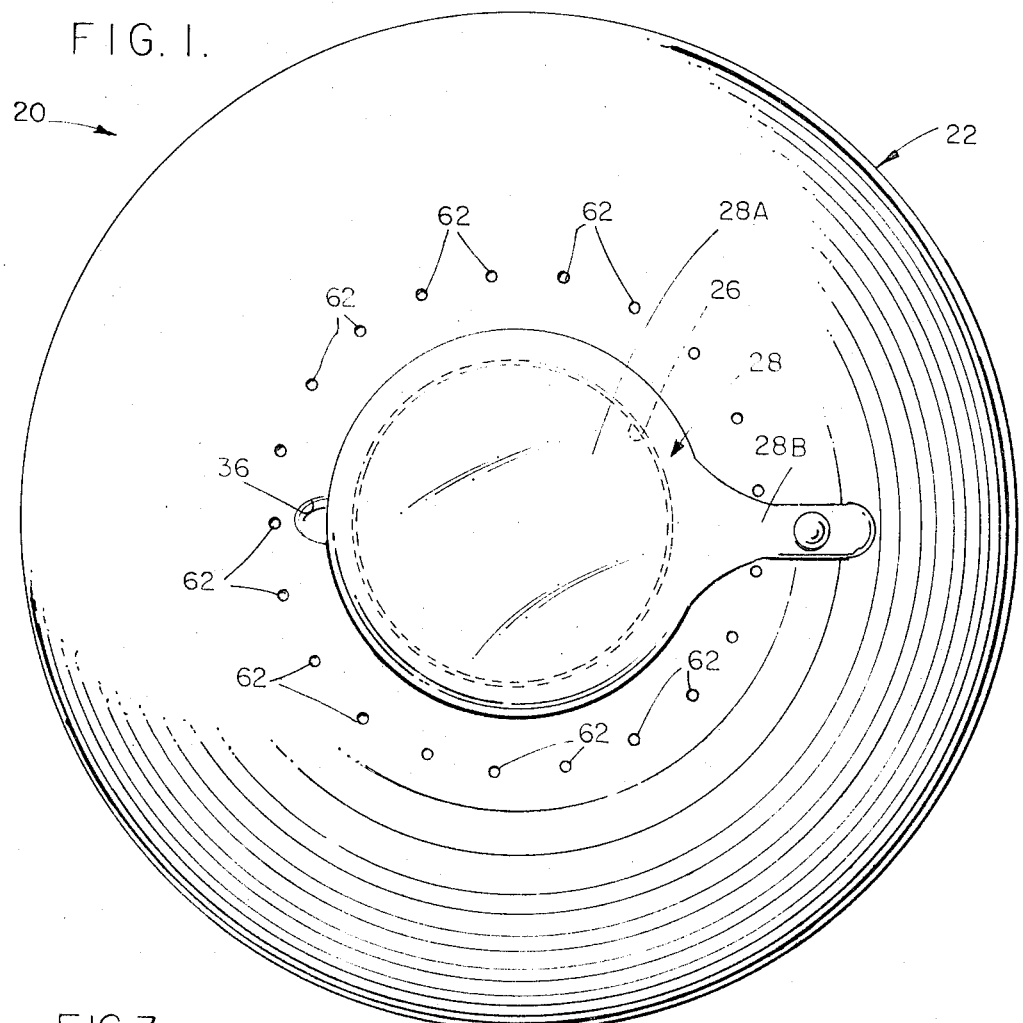
FIG. 1 illustrates a top plan view of the spherical observatory pursuant to the present invention and incorporating a detachable closure element for permitting introduction of an animal into the sphere.
Figure 7:
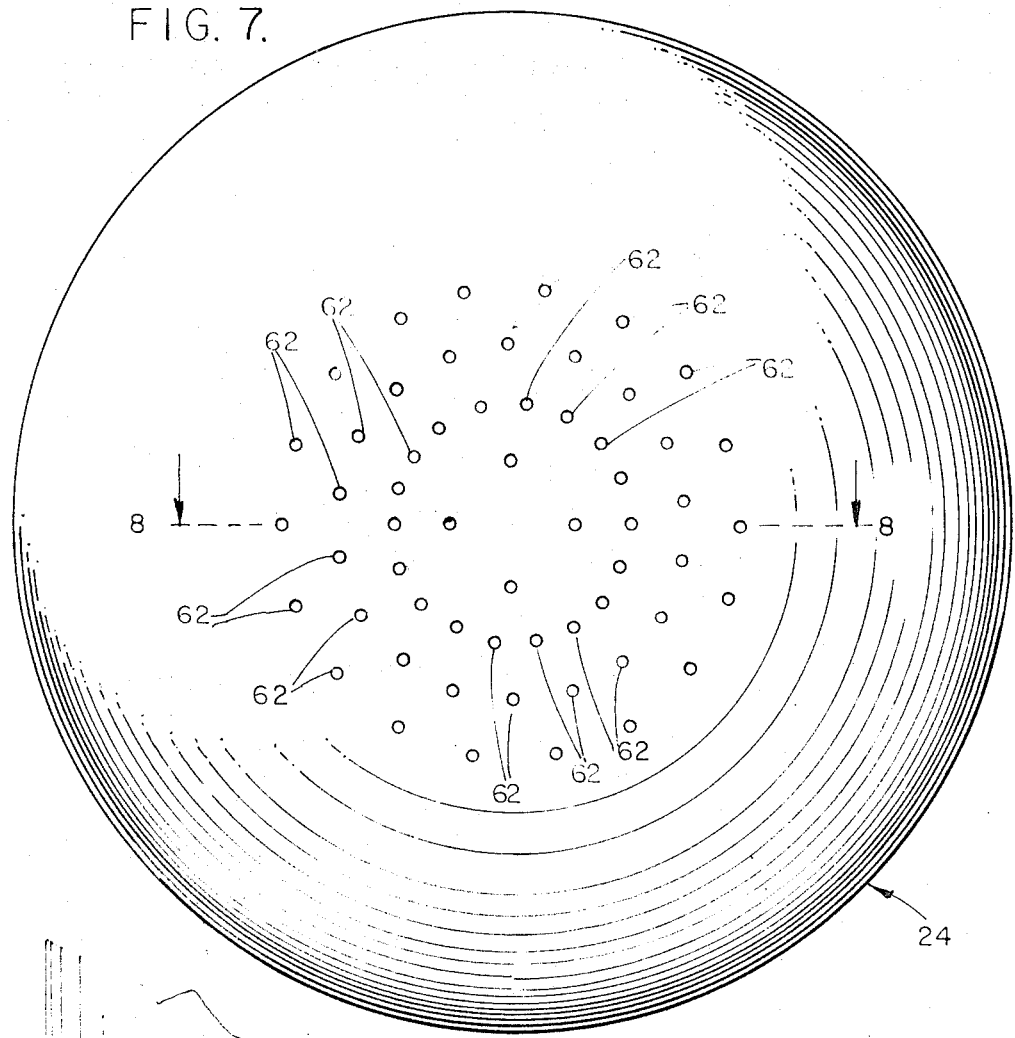
FIG. 7 illustrates a bottom plan view of the sphere pursuant to the present invention.

Referring now to the drawings, and more particularly to FIGS. 1 and 7 thereof, the present invention relates generally to a hollow spherical body denoted by the reference character 20. The spherical body 20 includes a generally hemispherical upper portion 22 and a generally hemispherical lower portion 24 (FIGS. 1 and 7 respectively), the upper and lower hemispherical portions 22 and 24 respectively, being generally fixedly connected to one another such as by adhesive or other conventional means along the annularly abutting exposed peripheral portions thereof (not shown). The upper portion 22 is provided with an animal access passageway denoted generally by the reference character 26 with which is detachably associated a closure element or door 28.

The hollow spherical body 20 is constituted generally of rigid transparent thermoplastic such as polystyrene or the like, whereas the door or closure element 28 is constituted preferably of an elastomeric thermoplastic such as polyethylene or the like so as to be press-fit or force-fit into the animal access passageway 26 in a manner as will be further clarified below.

Figures 2, 3:
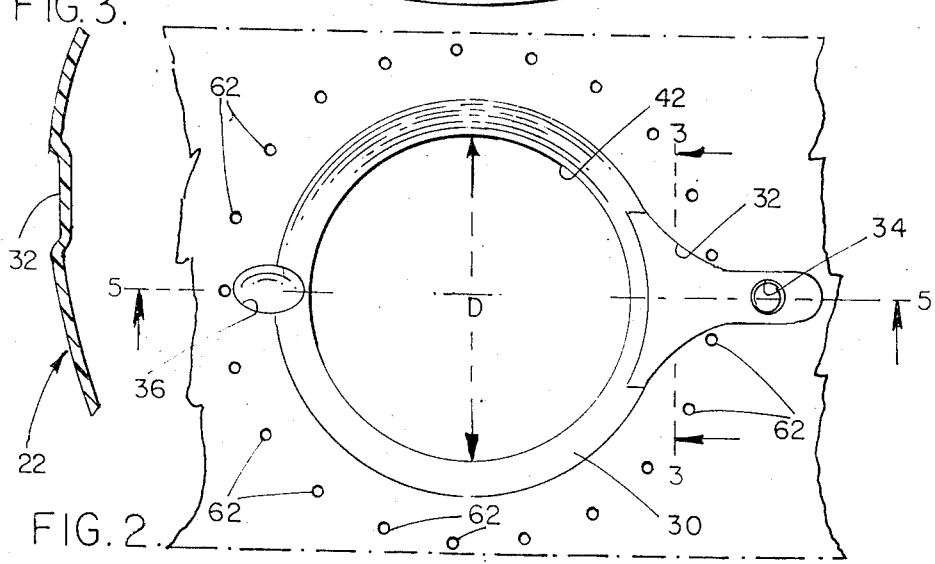
FIG. 2 illustrates a fragmentary plan view of the upper portion of the sphere with the detachable closure element removed therefrom.
FIG. 3 illustrates a fragmentary cross-sectional view taken along the line 3—3 in FIG. 2.

In this respect, the animal access passageway 26 is provided with a countersunk peripheral ledge 30, as illustrated in FIG. 2, and adjoining the passageway 26 at the rightmost portion illustrated in FIG. 2 is a generally longitudinally tapered, transversely depressed, external concavity 32 through which extends an aperture 34, the latter which is best illustrated in FIG. 6. Diametrically opposite the concavity 32 and formed as part of a peripheral portion of the sphere 20 adjoining the animal access passageway 26 is a depression 36 of generally oval extent, the purpose of which will likewise be clarified below.

The closure element or door 28 is generally paddle-shaped, having a face portion 28A and a stem portion 28B as appearing in FIG. 1, and provided with an external or exposed partially spherical convexity which in contour, in a manner partially illustrated in FIG. 4, is both laterally and longitudinally complemental to the contour of the sphere. A wall 38 of slightly or partially frusto-conical appearance extends downwardly from the peripheral underside 40 of the face portion 28A of the closure element 28, the wall 38 having a slightly greater external diameter at the extreme bottom portion thereof than at the upper portion thereof most proximate the peripheral underside 40. Moreover, the slightly greater diameter of the wall 38 at the bottom portion thereof is also slightly greater than the diameter D of the ledge 30, as illustrated in FIG. 2, so as to permit press-fit engagement of the wall 38 against the surrounding generally vertical portion 42 of the ledge 30 while the peripheral underside 40 of the face portion 28A rests in direct contact with the horizontal extent of the ledge 30 flushly.

Figure 9:
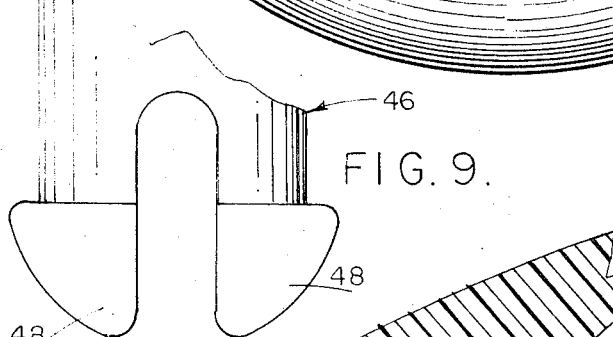
FIG. 9 illustrates an enlarged vertical fragmentary view of the rightmost end portion of the closure element illustrated in FIG. 4 for association with the structure illustrated in FIG. 6.
Figure 10:
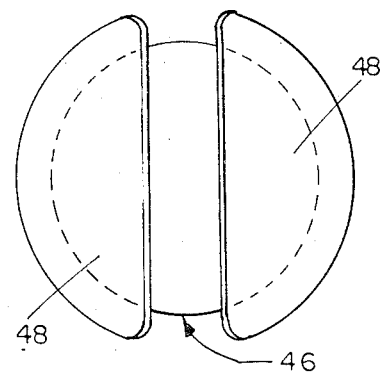
FIG. 10 illustrates a bottom plan view of the structure illustrated in FIG. 9.

The stem portion 28B of the closure element 28 tapers laterally so as to conform to the contour of the concavity 32 provided adjacent the access passageway 26 in the spherical body 20, and has a transverse thickness which may be accommodated within the concavity 32 so as to permit an elastomeric generally cylindrical notched lug 46 having a pair of shouldered limbs 48, in a manner illustrated generally in FIGS. 4, 9 and 10, to be forced through an upper portion 50 and lower portion 52, extending in countersunk relation with one another as part of the aperture 34 provided in the concavity 32, so as to be generally pivotally connected therein.

Clearly, because of the provision of the external partially spherical convexity of the closure element or door 28, which is complemental to the contour of the sphere 20, and because of the provision of the countersunk peripheral ledge 30 and the relationship of the concavity 32 with the animal access passageway 26, the exterior surface of the closure element or door 28 will blend or merge uniformly with the surrounding portion of the sphere 20 so as to provide a completely spherical contour which permits generally unrestricted universal translatory rolling of the sphere along any horizontal surface in contact therewith.

Clearly, the provision of the depression 36 beneath the closure element 28, permits manual uplifting of the closure 28 being elastomeric, for depositing a rodent or the like into the spherical body 20. Thereafter, the closure element 28 may be forced against the ledge 30 in force-fit relation against the vertical portion 42.

Figure 11:
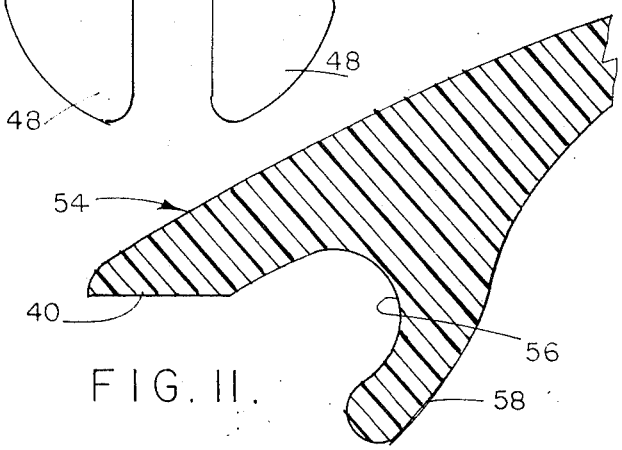
FIG. 11 illustrates an enlarged fragmentary vertical cross-sectional view of the leftmost end portion of the closure element illustrated in FIG. 4.

In order to enhance the extent of detachable interlocking of the closure element 28 within the passageway 26 of the sphere 20, as illustrated in FIG. 11, the leftmost portion of the face 28A of the closure element 28, and denoted generally by reference character 54 in FIG. 11, is provided with a generally U-shaped notch 56, which may or may not extend entirely peripherally along the underside 40 of the face portion 28A, to thereby define a limb 58 similar to the aforementioned wall 38 spaced from the peripheral underside 40 of the face portion 28A which can be elastically squeezed along the generally vertical portion 42 of the ledge 30 and, thereby, permit capture of the interior of the ledge 30 within the notch 56. Clearly, this arrangement, as shown on enlarged scale in FIG. 11, may be of more reliable nature for preventing an animal from escaping from the sphere 20.

In a manner generally illustrated in FIG. 8, both the upper hemispherical portion 22 and lower hemispherical portion 24 of the sphere 20 may be provided with an interior of roughened texture, or more particularly with inwardly extending apertured projections, each of which is generally laterally and longitudinally rounded in a partially spherical rigid manner so as to permit an animal confined in the sphere 20 to grasp these projections 60 to enhance the ease by which the animal may move relative to the interior of the sphere 20. The rounded nature of these projections 60 acts to present the interior with a generally gnaw-resistant capacity, gnawing being an inherent tendency characteristic of rodents, and thereby resists damage to the sphere 20.

Moreover, each of the projections 60 is longitudinally hollow or provided with respective apertures 62 for permitting the ingress of air into the sphere 20, yet because of the inward extent of these projections 60, liquid animal excrement such as urine or the like is substantially prevented from penetrating the apertures 62 and egressing from the sphere 20. The apertures 62 may themselves be tapered from an enlarged opening proximate the surface of the sphere 20 to a reduced opening remote from the sphere surface.

Accordingly, the present invention, because of its spherical transparent nature, permits a rodent to be confined therein, yet because of its translatory rolling capacity, and the relationship of the closure element as being complemental in contour to the remainder of the sphere 20, the rodent may be continuously observed as he causes generally unrestricted universal translatory rolling of the sphere along the floor in the home of the hobbyist or other horizontal surface. Obviously, the projections 60 permit an animal within the sphere 20 to move relative to the interior of the sphere 20 universally in any direction, the projections being apertured for permitting ingress of air into the sphere 20, yet also being urine retentative so as to prevent the surrounding environment from being stained or otherwise damaged.

Pursuant to an alternate embodiment of the present invention, and pursuant to the concept of providing an observatory which may be cleaned effectively and may provide ready access thereinto, reference is now made to FIGS. 12-14.

In this respect, the alternate embodiment is provided with a spherical body generally denoted by the reference character 80. The sphereical body 80 incorporates both an upper and a lower hemisphere, 82 and 84 respectively, each of which terminates in an annular open portion which is interfittingly associated with the other or its mate. The interfitting relationship for the detachment or the assembling of the upper and lower hemispheres 82 and 84 respectively, may be effected through the intermediary of mating ledges 86 or the like as generally denoted in FIG. 13.

The alternate embodiment of the present invention is provided with apertured projections, such as the apertured projections 60 for the embodiment illustrated in FIGS. 1-11, although not shown in FIGS. 12-14. Pursuant to the concept of the alternate embodiment, the latter is provided with a pair of closure elements generally denoted by the reference character 90. The closure elements extend in diametrically opposed relation and are constituted preferably of polyethylene so as to be at least partially deformable for purposes as will be described below. In this instance, likewise, the spherical body 80 is constituted of transparent rigid polystyrene, preferably, so as to permit observing of the animal when confined therein.

The closure elements 90 are each provided with a retaining collar 92 which is, likewise, elastomeric or easily deformable and is integral with the closure elements 90 through the intermediary of elastomeric hinge-like transition portions 94 of generally reduced thickness so as to facilitate effective bending thereof and permit uplifting of the closure elements 90 relative to the spherical body 80 in a manner as will be described below.

In this respect, each of the closure elements 90 is provided with a wall of generally annular extent, the wall being denoted generally by the reference character 96. Each of the walls 96 is provided with an externally disposed annular ridge 98, as best illustrated in FIG. 14.

The spherical body 80 is provided with a pair of animal access passageways 99 respectively with which the closure elements 90 respectively are associated with in generally snap-fit or press-fit relation, the passageways extending generally transversely of the ledges 86 or open ends of the hemispheres 82 and 84. Each of the animal access passageways 99 respectively is provided with a projecting split annular shoulder 100 constituted of a pair of mating segments 100A and 100B which abut one another to form preferably the generally cylindrical passageway 99, each having both an outer and an inner annular groove 102 and 104 respectively for association with the closure elements 90. In this respect, the inner groove 104 conforms in diameter substantially to the maximum diameter of the annular ridge 98 provided on the wall extending from the closure elements 90. Thus, the annular ridge 98 may be press-fit and seated into the inner groove 104 so as to permit detachable closing of the closure element 90 relative to each of the animal access passageways 99 of the spherical body 80. Moreover, the outer groove 102 of the annular shoulder 100 conforms generally in diameter to the minimum diameter of the retaining collar 92 such that the latter may seat effectively therein and secure the hemispheres 82 and 84 to one another because of the transverse relationship of the passageways 99 with the open ends of the hemispheres, yet because of the elastomeric nature of the retaining collar 92, the collar 92 may be effectively detached when necessary from the annular shoulder 100 surrounding the animal passageways 99 respectively. The retaining collars 92 when removed permit detachment of the hemispheres 82 and 84 from one another, yet when surrounding the outer groove 102 of the shoulder 100 act as coupling means for securing the hemispheres to one another.

Accordingly, pursuant to the concept of the alternate embodiment of the present invention as illustrated in FIGS. 12-14, the closure elements 90 may be effectively opened and closed relative to the passageways 99, the latter which afford or enhance maximum access into and out of the spherical body 80 for rodent disposition therein. Moreover, because of the relationship of the upper and lower hemispheres 82 and 84 respectively, the entire assembly as illustrated in FIGS. 12-14 affords maximum access thereinto when the hemispheres 82 and 84 respectively are detached from one another for cleaning purposes, such as cleaning of animal excrement, food and other matter which eventually cause undesirable odors in observatories of this nature.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. An animal exercising observatory comprising a hollow sphere, said sphere being provided with an animal access passageway, enclosure means operatively associated with a portion of said sphere adjacent said access passageway for permitting selective opening and closing of the latter, said closure means including an exposed partially spherical external convexity which in contour is complemental to said sphere and which when closing said access passageway permits generally unrestricted universal translatory rolling of said sphere along an external surface in contact therewith, said closure means being at least partially elastomeric and operatively associated with said access passageway in generally press-fit relation, said sphere including an internal surface having a plurality of inwardly extending rigid apertured projections communicating the interior of said sphere with the exterior of the latter, said apertured projections serving to permit ingress of air into said sphere, acting to retain animal-excrement internally of said sphere, and providing an interior roughened texture which enhances the ease by which an animal can move relative thereto.

2. An animal exercising observatory as claimed in claim 1 wherein said projections are of rounded contour, both laterally and longitudinally, for resisting animal gnawing.

3. An animal exercising observatory as claimed in claim 1 wherein said sphere includes a pair of mating, generally hemispherical, portions connected to one another.

4. An animal exercising observatory as claimed in claim 1 wherein said access passageway includes a countersunk peripheral ledge against which is engageable a peripheral underside portion of said closure means.

5. An animal exercising observatory as claimed in claim 4 wherein said countersunk ledge is sufficiently below a surrounding external surface of said sphere such that said exposed partially spherical convexity of said closure means generally merges and blends uniformly with said surrounding external surface of said sphere.

6. An animal exercising observatory as claimed in claim 5 wherein said closure means includes a generally frustoconical wall which is at least partially elastomeric and is operatively associated with said access opening in generally press-fit relation.

7. An animal exercising observatory as claimed in claim 6 wherein said sphere includes an external concavity adjacent said access opening, said closure means including a stem end portion having a thickness accommodated in said external concavity and pivotally secured thereto.

8. An animal exercising observatory as claimed in claim 7 wherein said stem end portion of said closure means includes an elastomeric notched lug, said notched lug including a pair of shouldered limbs, said external concavity of said sphere having an aperture extending therethrough and through which said notched lug detachably projects pivotally such that said shouldered limbs abut against the interior of said sphere.

9. An animal exercising observatory as claimed in claim 6 wherein said sphere includes a depression adjacent said access opening over which extends in spaced relation a peripheral portion of said closure means, thereby, permitting detachable uplift of said closure means.

10. An animal exercising observatory as claimed in claim 1 wherein said sphere is constituted of generally rigid transparent thermoplastic for permitting generally universal observation of an animal in said sphere.

11. An animal exercising observatory as claimed in claim 1 wherein said hollow sphere is provided with a pair of animal access passageways in generally diametrically opposite relation, and a pair of generally elastomeric closure means operatively associated with said passageways respectively in detachable press-fit relation.

12. An animal exercising observatory as claimed in claim 11 wherein each of said closure means includes an annular collar, a partially spherical door, and transition means of reduced thickness interposed between and integrally connecting said collar and door, said passageways including a projecting annular shoulder having an outer periphery surrounded detachably by said collar and an inner periphery associated with said door in press-fit relation.

13. An animal exercising observatory as claimed in claim 12 wherein said door includes a generally annular wall, said annular wall including an external annular ridge, said shoulder having inner and outer annular grooves, said collar being detachably seated in said outer annular groove, said annular ridge being insertable into said inner annular groove in snap-fit relation.

14. An animal exercising observatory as claimed in claim 12 wherein said sphere includes a pair of hemispheres each having an open end for abutting the other, the open end of each of said hemispheres extending generally transversely of said passageways.

15. An animal exercise observatory as claimed in claim 11 wherein said sphere includes a pair of hemispheres each having an open end for abutting the other, each said hemisphere including a pair of projections extending generally transversely of the associated hemisphere, each of said projections abutting the projection of the abutting hemisphere, annular collar means for holding said abutting projections in a close fit relation, said abutting projections together comprising, at least in part, the animal passageway.

16. An animal exercising observatory comprising a hollow transparent sphere, said sphere including a plurality of inwardly extending projections each of which is longitudinally hollow, each of said projections being provided with a channel tapering from an enlarged opening at the sphere surface to a reduced opening remote from the sphere surface, and means permitting access to said sphere for introduction of an animal thereinto.

* * * * *